United States Patent

Hayden

[19]

[11] Patent Number: 5,837,303
[45] Date of Patent: Nov. 17, 1998

[54] METHOD FOR KILLING MICROORGANISMS IN LIQUIDS

[75] Inventor: Steven Mark Hayden, Wetumpka, Ala.

[73] Assignee: Mark Hayden, Wetumpka, Ala.

[21] Appl. No.: 835,173

[22] Filed: Apr. 7, 1997

[51] Int. Cl.⁶ .................................. A23C 3/00; A23L 3/00
[52] U.S. Cl. ........................... 426/237; 422/20; 426/238; 426/522
[58] Field of Search .................................. 426/237, 238, 426/522, 599; 422/20, 22; 99/451

[56] References Cited

U.S. PATENT DOCUMENTS

| | | | |
|---|---|---|---|
| 3,352,693 | 11/1967 | Berk | 426/238 |
| 4,946,702 | 8/1990 | Stipp et al. | 426/599 |
| 5,026,564 | 6/1991 | Hayden et al. | 426/237 |
| 5,049,400 | 9/1991 | Hayden | 426/237 |
| 5,232,726 | 8/1993 | Clark et al. | 426/599 |
| 5,514,391 | 5/1996 | Bushnell et al. | 426/237 |

FOREIGN PATENT DOCUMENTS 0 689 774 A2  3/1996  European Pat. Off. .

OTHER PUBLICATIONS

Dialog Data Base, File 434, Dialog Acc. No. 14971860, Abstracting "Critical Reviews In Food Science And Nutrition", V36, N6, pp. 603–627, 1996.

Dialog Data Base, File 351, Dialog Acc. No. 002266614, Abstracting Soviet patent 634733, Nov. 30, 1978.

*Primary Examiner*—George Yeung
*Attorney, Agent, or Firm*—Veal & Associates

[57] ABSTRACT

An improved method for treating liquid foodstuffs to prolong their shelf life wherein the liquid is exposed to intense agitation, preferably through sonication, to disrupt cell walls and membranes of any microorganisms present in the liquid. The liquid is either simultaneously or subsequently exposed to an electrical field. The intense agitation disrupts the cell walls and membranes of the microorganisms so that an electrical current can be introduced through any openings formed in the cell walls and membranes and through their intracellular matrices to kill the microorganisms. It is preferable to expose the liquids to torsional forces so that any microorganisms will be rotating through the stationary electrical field. As a result any openings in the cell walls and membranes of the microorganisms will at some point become aligned with the electrical field so that current can be introduced within the cells to destroy the microorganisms.

26 Claims, 3 Drawing Sheets

METHOD FOR KILLING MICROORGANISMS IN LIQUIDS

FIELD OF THE INVENTION

The present invention relates to a method for treating liquids to reduce microorganism levels. More particularly, the present invention relates to a method utilizing an electrical field to destroy microorganisms in liquid foodstuffs to extend their shelf life.

BACKGROUND OF THE INVENTION

Extensive efforts have been made to prolong the shelf life of perishable liquid foodstuffs, such as milk and fruit juices. The presence of microorganisms in these liquids is the primary cause of their degradation. The most common process employed to inactivate these microorganisms is heat pasteurization. However, to destroy substantially all the microorganisms, the pasteurization temperatures must be very high, a process called ultra-high temperature (UHT) pasteurization. Adverse effects result from UHT pasteurization and include unfavorable colors, odors and flavors.

Several methods have been developed which attempt to overcome the problems with UHT pasteurization but which still destroy substantially all the microorganisms. These methods include the application of sound fields or electrical fields to liquid foodstuffs. Although these methods have proven somewhat successful, the temperature of the treated liquid can quickly rise to a level where the product is adversely effected. To avoid the same temperature effects seen in UHT pasteurization, the duration of exposure, or the sound amplitude or electrical field strength must be decreased. Either alternative sacrifices the desired level of microorganism destruction necessary to prolong the shelf life of the liquid foodstuffs.

It has been observed that cells of microorganisms typically have a conductive outer layer that protects the microorganisms from electrical current by preventing the current from flowing inside the cells. To address this feature, present methods utilizing electrical fields for sterilizing liquid foodstuffs must use a sufficient electrical field strength or duration of exposure to overcome this protective mechanism and destroy the microorganism. However, the electrical field strength or duration of exposure necessary to inactivate substantially all the microorganisms typically elevates the temperature to a point where the liquid is adversely effected leading to an inferior product.

Various methods have been developed to address this problem. One recently developed method is disclosed in U.S. Pat. No. 5,514,391 to Bushnell et al. wherein Bushnell teaches a plurality of electrical field treatment zones with cooling zones between the treatment zones for preventing the liquid from obtaining an excessive temperature. Although Bushnell addresses the temperature problems, he must still subject the liquid to multiple high intensity electrical pulses in each treatment zone to kill the microorganisms.

It is postulated that electrical current is more lethal when traveling within the cell rather than along the cell surface because internal current damages essential intracellular organelles instead of only the cell surface. Thus, if cell walls and membranes can be compromised so that an electrical current can be introduced within the cells, microorganisms can be killed with a lesser electrical field strength or duration of exposure than would be required to kill healthy microorganisms. As a result, the microorganism levels in liquid foodstuffs can be effectively reduced without the excessive temperatures which can lead to unfavorable colors, odors or flavors.

SUMMARY OF THE PRESENT INVENTION

It is the object of the present invention to provide a commercially viable method for treating large quantities of liquid foodstuffs to prolong their shelf life.

It is another object of the present invention to provide a method for treating liquid foodstuffs which kills microorganisms without producing unfavorable colors, odors or flavors.

It is another object of the present invention to provide a method wherein liquid foodstuffs are exposed to intense agitation to disrupt the cell membranes of microorganisms.

It is another object of the present invention to provide a method wherein liquid foodstuffs are exposed to an electrical field concomitantly with the intense agitation to inactivate microorganisms.

It is another object of the present invention to provide a method wherein liquid foodstuffs are exposed to an electrical field subsequent to the intense agitation to inactivate microorganisms.

These and other objects of the present invention are accomplished through an improved method for treating liquid foodstuffs to prolong their shelf life wherein the liquid is exposed to intense agitation, preferably through sonication, to disrupt cell walls and cell membranes of any microorganisms present in the liquid. The liquid is either simultaneously or subsequently exposed to an electrical field. The intense agitation disrupts the cell walls and membranes of the microorganisms so that an electrical current can be introduced through any openings formed in the cell walls and membranes and through their intracellular matrices to kill the microorganisms. It is preferable to expose the liquids to torsional forces so that any microorganisms will be rotating through the stationary electrical field. As a result, any openings in the cell walls and membranes of the microorganisms will at some point become aligned with the electrical field so that current can be introduced within the cells to destroy the microorganisms.

These and other objects and advantages of the invention will become apparent from the following detailed description of the preferred embodiment of the invention.

BRIEF DESCRIPTION OF THE DRAWINGS

Features of the invention are described in the accompanying drawings which form a portion of this disclosure and wherein.

DETAILED DESCRIPTION OF THE PREFERRED EMBODIMENT

A more complete understanding of the present invention may be obtained by reference to the accompanying drawings wherein the invention comprises a method for treating liquid foodstuffs, such as milk and fruit juices, to prolong their shelf life. This is accomplished by inactivating the microorganisms present in the liquid, which includes molds, yeast, bacteria, spores, cysts, and the like. Throughout the process, the temperature of the liquid is maintained above freezing and below 200° F. at a temperature appropriate for the type of liquid processed and the microorganisms which are targeted for destruction. The liquid is first pumped through a narrowing first chamber 11 and funneled through a small orifice 12 into a second chamber 13. The orifice 12 can range from about 2 microns to about 1 millimeter in diameter, however, the preferred range is between about 20 microns and about 250 microns. The pressure on the liquid across the orifice 12 is between about 50 psi to about 50,000 psi, and preferably between about 1500 psi to about 5,000 psi.

Figure 1:
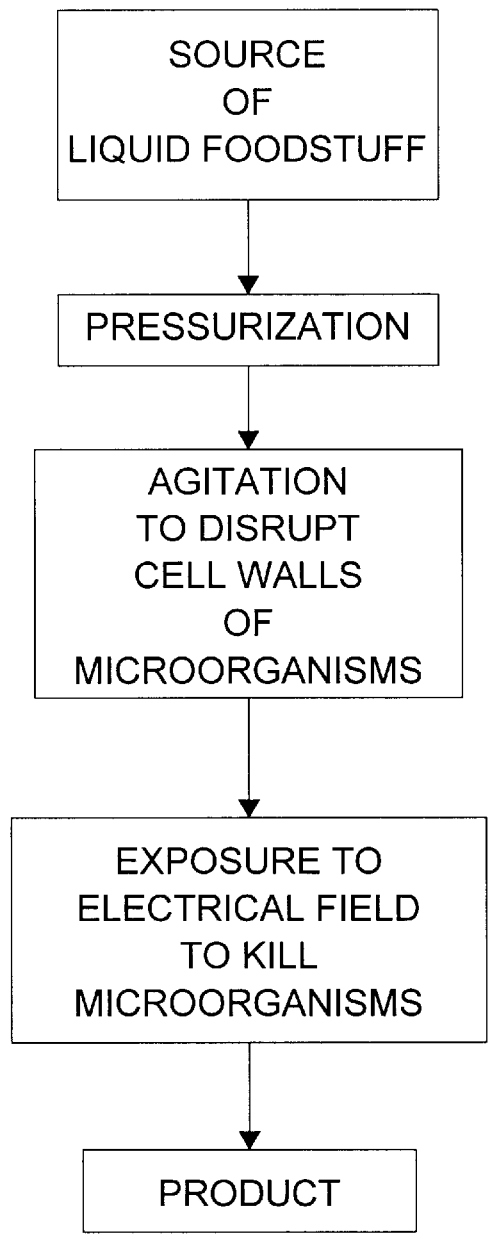
FIG. 1 is flow diagram of the present invention illustrating a method for treating liquid foodstuffs to kill microorganisms.
Figure 2:
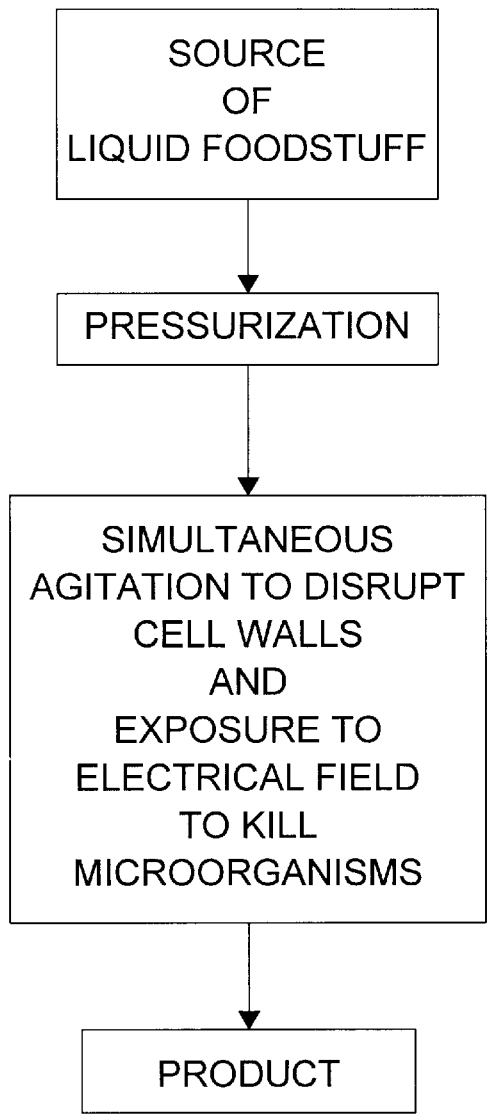
FIG. 2 is flow diagram of the present invention illustrating an alternate method for treating liquid foodstuffs to kill microorganisms.
Figure 3:
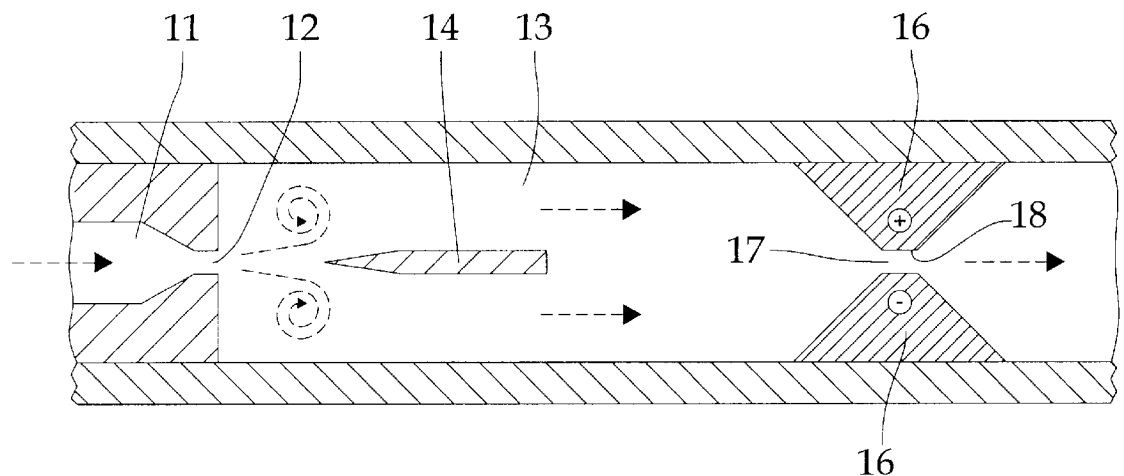
FIG. 3 is a schematic sectional view of the present invention wherein liquid foodstuff is first sonicated and subsequently exposed to an electrical field.
Figure 4:
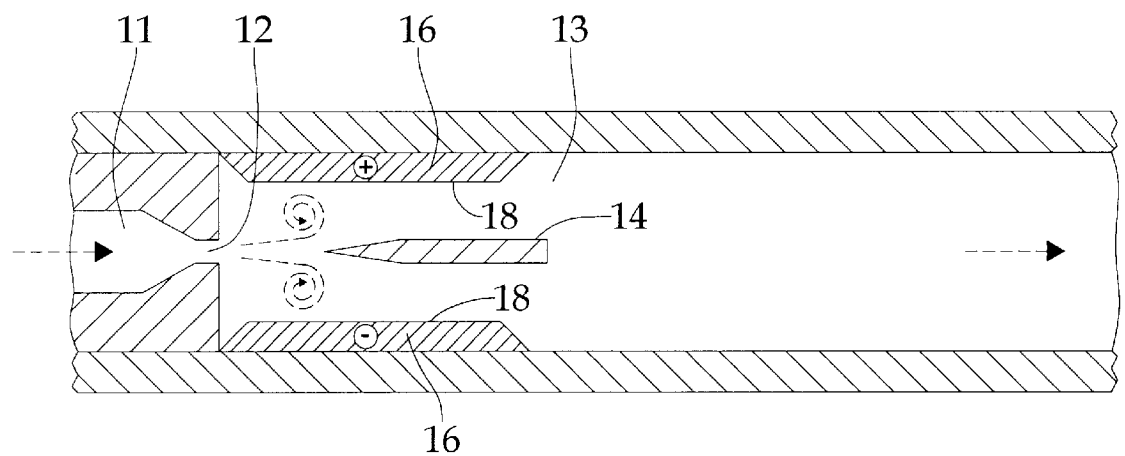
FIG. 4 is a schematic sectional view of the present invention wherein liquid foodstuff is simultaneously sonicated and exposed to an electrical field.

As the liquid is propelled into the second chamber 13, it is exposed to intense agitation which disrupts the cell walls, or cell membranes, of any microorganisms present in the liquid. The cell walls are preferably disrupted in a sonication field utilizing a vibrational blade 14 or column. Sonicators used in this manner are well known in the art. FIGS. 3 and 4 show a fluid stream exiting the orifice 12 under pressure and approaching an obstacle 14 from which is emitted either a standing or longitudinally traveling sound wave of ultrasonic frequency. The duration of exposure to sonication is brief because it is unnecessary to kill the microorganisms at this point, but rather, the purpose of this step is to disrupt the cell wall and introduce breaks in it. The liquid can be simultaneously exposed to an electrical field 16, as shown in FIG. 4, or subsequently exposed to the electrical field 16, as shown in FIG. 3. In addition, transducers or other disruption mechanisms can be used to disrupt the cell wall prior to sonication.

In FIG. 3, after the liquid is sonicated, the liquid continues through the second chamber 13 which narrows to an elongated gap 17 with a distance between the gap surfaces 18 between about 2 microns and about 1 millimeter, and preferably between about 20 microns and about 250 microns. As the liquid travels through the gap 17, it is exposed to an electrical field. The narrowing of the second chamber 13 causes turbulence within the liquid. This is an important feature for reasons expounded upon below. In FIG. 4, as the liquid is sonicated, it is simultaneously exposed to an electrical field. The distance between the gap surfaces 18 in this embodiment can be much larger than the embodiment of FIG. 3 because the liquid is already experiencing turbulence as a result of the pressurized liquid being propelled into the second chamber 13, coming in contact with the obstacle 14, and being sonicated. The gap surfaces 18 comprise a suitable conducting material connected to a source of electrical energy such that a current applied therethrough can establish an electrical field across the gap 17, and the remainder of the processing apparatus preferably comprises a non-conductive material. A constant electrical direct current (DC) is applied across the gap 17 while the liquid is being propelled therethrough. The strength of the electrical field can vary between about 500 volts per centimeter to about 1 million volts per centimeter, preferably between about 10,000 volts per centimeter to about 25,000 volts per centimeter.

Figure 5:
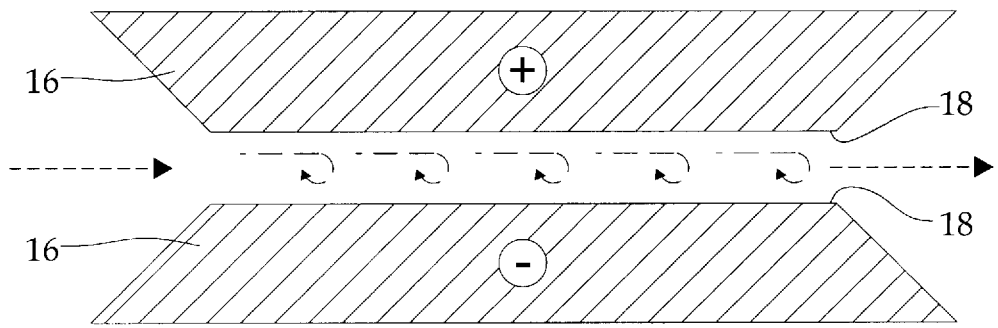
FIG. 5 is a sectional view of the electrical field gap illustrating rotational forces on liquid foodstuff as it passes therethrough.

If the cell walls of the microorganisms have any openings therein, current can flow though these openings into the intracellular matrices of the cells to kill the microorganisms. As a result of the turbulence, any microorganisms present in the liquid are exposed to torsional forces which cause them to spin through the stationary electrical field, illustrated in FIG. 5. As a result, any openings in the cell walls of the microorganisms will at some point become aligned with the electrical field so that the cell wall openings are at different potential energy levels, thus an induced internal current can flow within the cells to destroy the microorganisms. This rotational feature is important because if a microorganism has an opening in its cell wall which is oriented normal to the electrical field, a current may not be induced through the internal matrix of the cell. As the microorganisms rotate through the electrical field, the stationary field appears as a rotating electrical field upon the microorganisms. Thus, at some point, any breaks present in the cell wall should align with the direction of the field. Additionally, since any microorganisms will pass through the electrical field in only a fraction of a second, the field also appears as an electrical pulse field to the microorganisms. Since the electrical field is stationary, everything that passes through the field will be exposed to a continuous field dose.

Figure 6:
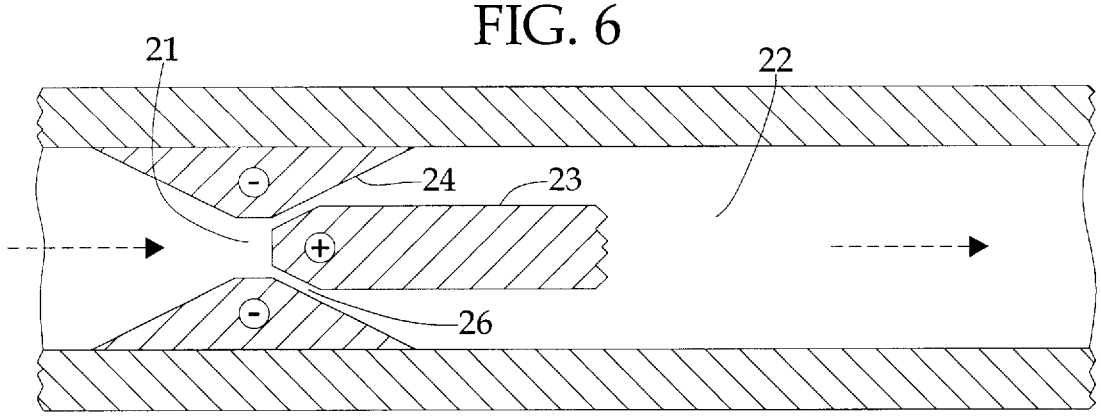
FIG. 6 is a schematic sectional view of the present invention wherein liquid foodstuff is simultaneously homogenized and exposed to an electrical field.
Figure 7:
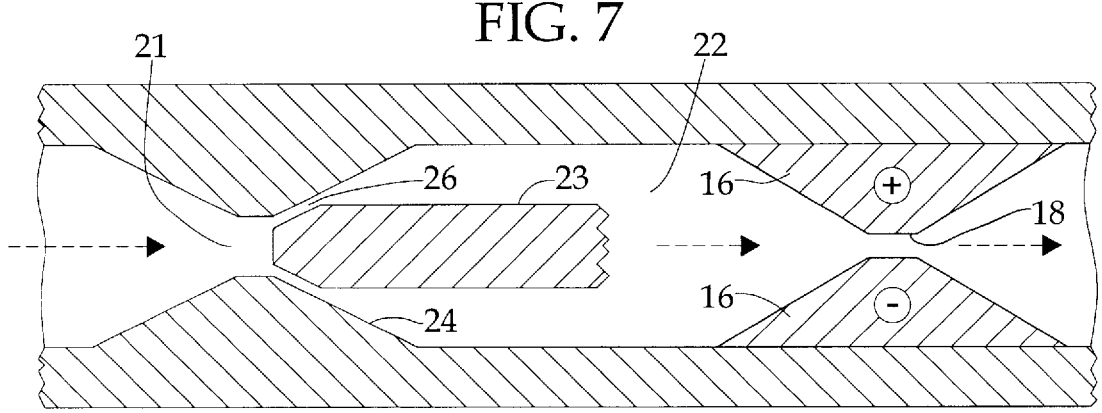
FIG. 7 is a schematic sectional view of the present invention wherein liquid foodstuff is first homogenized and subsequently exposed to an electrical field.

In an alternate embodiment, the process can utilize an homogenizing step rather than a sonicating step. FIGS. 6 and 7 show a fluid stream exiting an orifice 21 under pressure and entering an homogenization chamber 22 where the cell surfaces of the microorganism and disrupted. Homogenizers used in this manner are well known in the art. The homogenizing pestle 23 and the homogenizing chamber wall 24 adjacent the orifice 21 can comprise a suitable conducting material connected to a source of electrical energy such that a field can be established across the homogenizer slit 26 as shown in FIG. 6, with the remainder of the processing apparatus preferably comprising a non-conductive material. Thus, any microorganisms in the liquid are exposed almost simultaneously to cell wall disruption and induced electrical current. Again, the liquid is exposed to turbulence as a result of the pressurized liquid being propelled into the homogenization chamber 22, coming in contact with the pestle 23, and being homogenized. Alternately, the liquid can be exposed to the electrical field subsequent to cell disruption, shown in FIG. 7, similar to that shown in FIG. 3. An additional step can include sonicating the liquid prior to passing it through the homogenizer slit.

Although the use of electrical fields combining short pulses over gaps greater than 1 mm to kill microorganisms in liquid foodstuffs is known in the art, the use of a continuous electrical field applied over gaps less than 1 mm has never been done. Benefits of the present method include inactivation of microorganisms with less current than presently used methods, and capacitors can be eliminated because the current is DC. This saves resources and expenses and prevents the temperatures of the liquid from rising to a level where the product will be adversely affected. Additionally, the application of a stationary field using DC current is much easier to design and build than the capacitors that use pulses. Other embodiments of the present method can include the electrical field applied at various other points within the process, the electrical field can be a pulsed field as describe in U.S. Pat. No. 5,514,391, incorporated herein by reference, or cooling zones can be applied at various points throughout the process to insure proper temperatures are maintained. In addition, cells can be disrupted using other cell disruption techniques known in the art.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. A method for treating liquid foodstuffs to kill microorganisms therein, comprising the steps of:
   a) agitating said liquid foodstuffs to disrupt cell walls of said microorganisms and introduce breaks therein; and
   b) exposing said liquid foodstuffs to an electrical field comprising a continuous DC current so that an electrical current is induced through said breaks in said cell walls into the cells to kill said microorganisms.

2. A method according to claim 1 wherein said agitating step is performed by sonicating said liquid foodstuffs.

3. A method according to claim 1 wherein said agitating step is performed by homogenizing said liquid foodstuffs.

4. A method according to claim 1 wherein said exposing step is performed concomitantly with said agitating step.

5. A method according to claim 1 wherein said exposing step is performed subsequent to said agitating step.

6. A method according to claim 1 further comprising the step of subjecting said liquid foodstuffs to torsional forces so that said microorganisms rotate through said electrical field during said exposing step.

7. A method for processing liquid foodstuffs to kill microorganisms therein, comprising the steps of:
   a) pressurizing said liquid foodstuffs in a first chamber;
   b) propelling said liquid foodstuffs from said first chamber to a second chamber through a connecting orifice;
   c) agitating said liquid foodstuffs in said second chamber to disrupt cell walls of said microorganisms and introduce openings therein; and
   d) exposing said liquid foodstuffs to an electrical field comprising a continuous DC current so that an electrical current is induced through said openings formed in said cell walls into the cells to kill said microorganisms.

8. A method according to claim 7 wherein the pressure on said liquid foodstuffs across said orifice is between about 50 psi to about 50,000 psi.

9. A method according to claim 8 wherein the pressure on said liquid foodstuffs across said orifice is between about 1500 psi to about 5,000 psi.

10. A method according to claim 7 wherein said orifice has a diameter between about 2 microns to about 1 millimeter.

11. A method according to claim 10, wherein said orifice has a diameter between about 20 microns to about 250 microns.

12. A method according to claim 7 wherein said electrical field of said exposing step is between about 500 volts per centimeter to about 1 million volts per centimeter.

13. A method according to claim 12 wherein said electrical field of said exposing step is between about 10,000 volts per centimeter to about 25,000 volts per centimeter.

14. A method according to claim 7 wherein said exposing step is performed concomitantly with said agitating step.

15. A method according to claim 14 wherein said agitating step is performed by sonicating said liquid foodstuffs.

16. A method according to claim 14 wherein said agitating step is performed by homogenizing said liquid foodstuffs.

17. A method according to claim 16 wherein said electrical field of said exposing step is applied across a gap separating an homogenizing pestle and a wall of said second chamber adjacent said orifice.

18. A method according to claim 7 wherein said exposing step is performed subsequent to said agitating step.

19. A method according to claim 18 wherein said second chamber narrows to an elongated gap.

20. A method according to claim 19 wherein said electrical field of said exposing step is applied across said elongated gap.

21. A method according to claim 20 wherein said gap is between about 2 microns and about 1 millimeter.

22. A method according to claim 21 wherein said gap is between about 20 microns and about 250 microns.

23. A method according to claim 14 further comprising the step of subjecting said liquid foodstuffs to torsional forces so that said microorganisms rotate through said electrical field during said exposing step.

24. A method according to claim 19 further comprising the step of subjecting said liquid foodstuffs to torsional forces so that said microorganisms rotate through said electrical field during said exposing step.

25. A method for treating liquid foodstuffs to kill microorganisms therein, comprising the steps of:
   a) sonicating said liquid foodstuffs to disrupt cell walls of said microorganisms and introduce breaks therein; and
   b) exposing said liquid foodstuffs to a continuous electrical field less than 25 kV/cm so that an electrical current is induced through said breaks in said cell walls into the cells to kill said microorganisms.

26. A method according to claim 25 further comprising the step of subjecting, said liquid foodstuffs to torsional forces so that said microorganisms rotate through said electrical field during said exposing step.

* * * * *